United States Patent [19]

Levin

[11] 4,029,942
[45] June 14, 1977

[54] TRANSPARENT PRELAMINATE WITH ELECTRICAL CONNECTORS

[75] Inventor: Berton P. Levin, Santa Monica, Calif.

[73] Assignee: The Sierracin Corporation, Sylmar, Calif.

[22] Filed: Aug. 27, 1975

[21] Appl. No.: 608,091

[52] U.S. Cl. .............................. 219/522; 174/68.5; 219/345; 219/528; 219/541; 219/543; 219/547; 339/60 R; 339/183; 428/339

[51] Int. Cl.² ........................................ H05B 3/06

[58] Field of Search ......... 219/203, 345, 522, 528, 219/541, 543, 547; 428/339, 411, 456, 49; 174/68.5; 338/274; 339/60, 183, 211, DIG. 3

[56] References Cited

UNITED STATES PATENTS

| | | | |
|---|---|---|---|
| 2,625,640 | 1/1953 | Gaiser et al. | 219/522 |
| 3,113,284 | 12/1963 | Van Inthoudt | 338/274 |
| 3,166,371 | 1/1965 | Brown et al. | 339/60 |
| 3,403,368 | 9/1968 | Scardina | 338/274 X |
| 3,529,074 | 9/1970 | Levis | 174/68.5 |
| 3,612,745 | 10/1971 | Warren | 174/68.5 |
| 3,718,535 | 2/1973 | Armstrong et al. | 428/339 |
| 3,790,752 | 2/1974 | Boaz et al. | 219/522 |
| 3,794,809 | 2/1974 | Beck et al. | 219/203 |
| 3,947,618 | 3/1976 | Gruss | 428/49 |

FOREIGN PATENTS OR APPLICATIONS 1,196,330   7/1965   Germany ........................... 219/522

Primary Examiner—Volodymyr Y. Mayewsky
Attorney, Agent, or Firm—Christie, Parker & Hale

[57] ABSTRACT

A laminated electrically heatable window has a transparent electrically conductive layer embedded in the window to act as a sheet resistor, and conductive bus bars embedded in the window in contact with the resistive layer. A portion of each bus bar extends outside an edge of the window to a terminal connection for making electrical contact with a harness cable leading to an electric current source such as an automobile alternator. Each terminal connection comprises separate electrical contacts on the ends of the bus bar and the cable harness for forming a cooperating pin and socket connection normal to the bus bar. The electrical contacts are pressure fitted together and hermetically sealed from end-to-end in an electrically insulating, protective sleeve.

15 Claims, 6 Drawing Figures

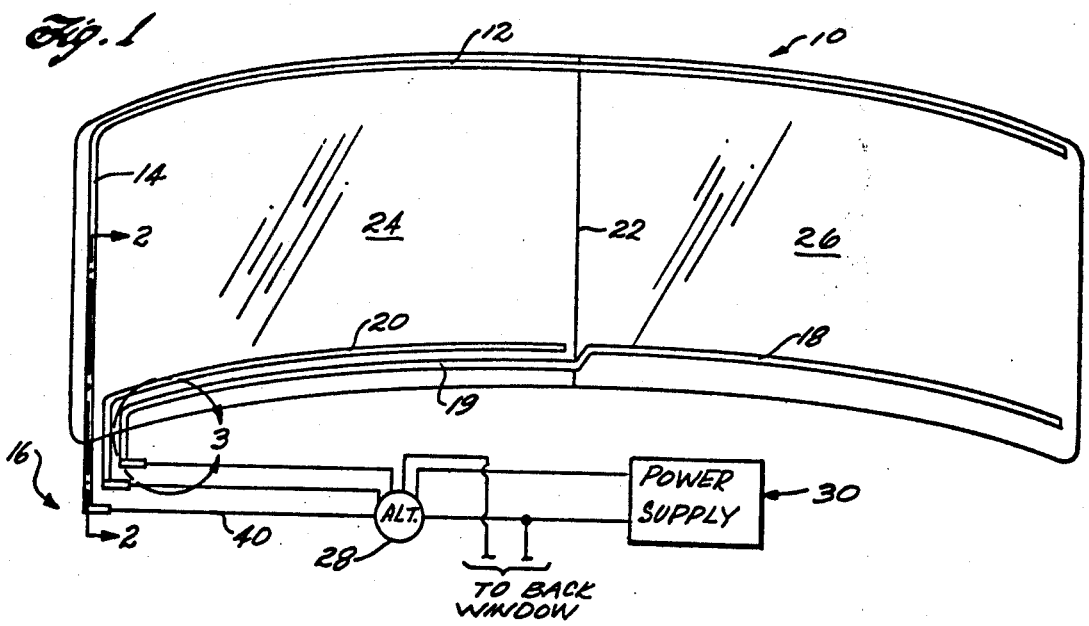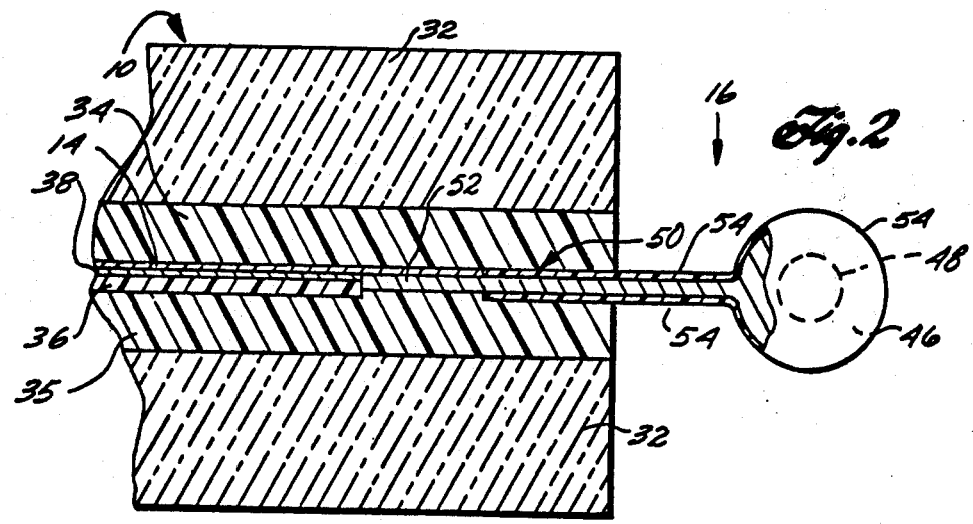

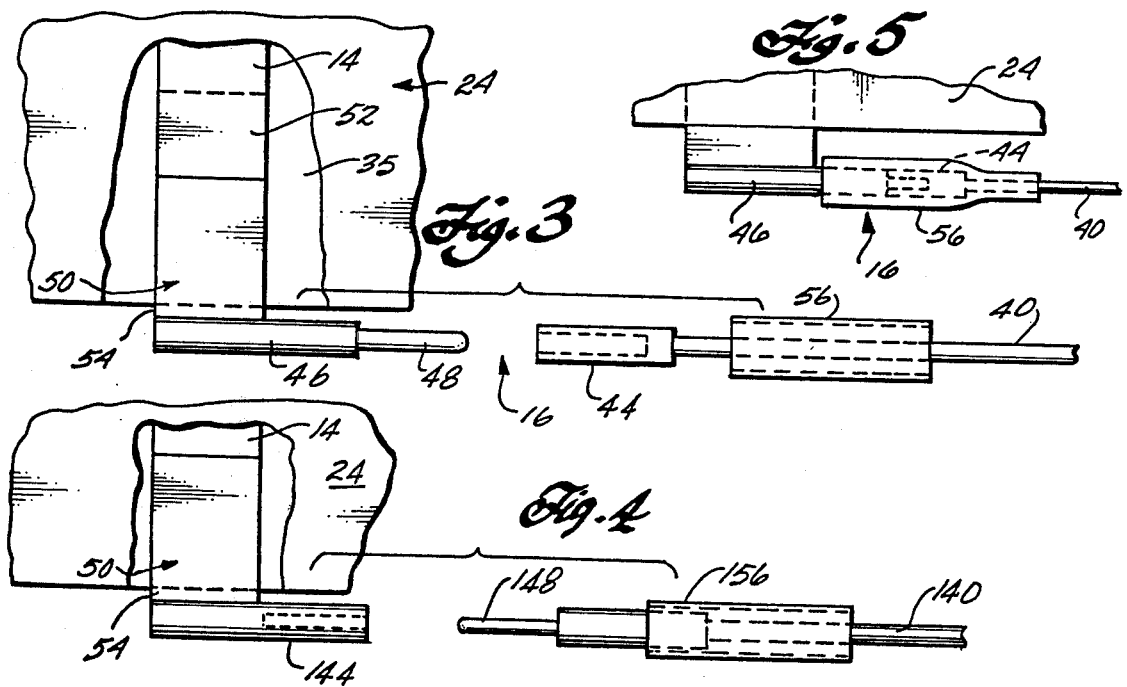
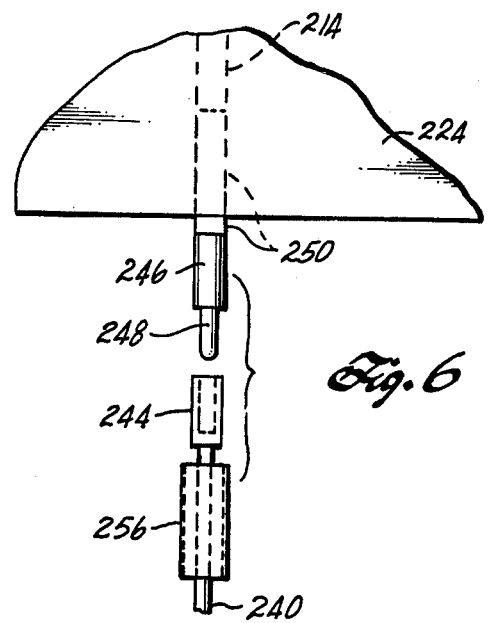

TRANSPARENT PRELAMINATE WITH ELECTRICAL CONNECTORS

BACKGROUND

This invention relates to laminated electrically heatable windows, and more particularly to an improved bus bar termination for making electrical contact between an electrically conductive layer in the window and a supply of electric current.

Recently, electrically heatable windows have been used for defrosting or defogging windshields and back windows of automobiles. One type of electrically heatable window includes a very thin conductive metal film on a carrier film of transparent plastic embedded in the window and extending over most of the area of the window. The metal film is so thin it is transparent to light, and when an electrical current is passing between its opposite edges, the metal acts as a sheet resistor. The metal film carries enough current to heat the windshield to inhibit condensation of fog or frost and remove accumulations of ice or snow.

Typically, the thin film of conductive metal is vacuum-deposited on a thin carrier film of plastic such as polyethylene terephthalate, commercially available as Du Pont's "Mylar". The carrier film is sandwiched between a pair of transparent sheets of interlayer material typically polyvinyl butyral which are, in turn, sandwiched between exterior face sheets of glass. Electriclly conductive bus bars, typically made of thin copper foil, are laminated into the heatable window between the vacuum coated side of the carrier film and the adjacent interlayer so they are in electricl contact with the thin conductive film.

Electric current applied between the conductive bus bars along opposite edges of conductive areas within the window assures uniform heating over the area of the window. The ends of the conductive bus bars are typically extended beyond the edge of the window for making electrical connection to a harness cable leading to the automobile alternator for supplying electric current to the window. In a typical prior arrangement, the ends of the foil bus bars extending beyond the edge of the window are substantially completely embedded in a flat, projecting laminate tab comprising relatively thin face sheets of plastic. The tab has small exposed areas above each bus bar for providing electrical contact between the bus bars and the harness cable.

Such electrically heatable windows for automobiles are normally manufactured by initially forming a "prelaminate" which includes the conductive carrier film, the plastic interlayers heat-bonded to opposite sides of the carrier film, and the bus bars embedded between the interlayers and the conductive film. The prelaminates then undergo a laminating process in which face sheets of glass are applied to the opposite sides of the prelaminate. The glass typically is applied by evacuating excess air out of the laminate and applying heat and pressure, such as by infrared heating or in an autoclave or by use of nip rolls, to tackify the interlayers to aid in bonding them to the glass. Thereafter, the assembly is put into an autoclave where heat and pressure are applied by an oil medium to complete bonding the interlayers to the glass sheets. The end-product from the laminating process comprises the laminated electrically heatable window having terminal connections for the embedded bus bars extending from a corner of the window in the projecting plactic tab described above.

The window is then shipped to the automobile assembly plant where the window is installed in the automobile. The terminal contacts of the bus bars are then connected to a harness cable for supplying electric current to the window heating element from the automobile alternator or generator. Typically, the contact on the end of the harness cable is a relatively complicated fitting which includes spring metal electrical contacts encased in an electrically insulated housing having a hinged closure. The bus bar tab at the corner of the window is fitted into the housing so the exposed areas of the contacts overlie the bus bars. The closure is then snapped to a closed position over the tab to apply pressure for holding the bus bars against the electrical contacts in the fitting. The harness terminals may be applied at the windshield laminating plant and shipped pre-assembled to the assembly plant.

It is important that the connection between the harness cable and the bus bar leads be in a waterproof seal, because this terminal connection, when installed in the automobile, is normally on the weather-side of the automobile firewall. The harness cable fitting described above relies on a sealing gasket and may be only partially waterproof.

It is also desirable for the bus bar termination to satisfy such requirements as (1) low cost, (2) good electrical contact after being subjected to the laminating process, (3) simplicity of attachment to the electrical cable harness, (4) minimal autoclave oil penetration which would disrupt the electrical contact, (5) adequate "pull" strength to resist tearing or separation of the bus bars, and (6) permitting the connector joint to be extended a substantial distance from the windshield, if desired. The harness cable fitting described above has adequate pull strength, but only partially satisfies these other requirements.

The present invention provides an improved bus bar termination which is completely waterproof and also meets all the requirements enumerated above.

SUMMARY

Briefly, a preferred embodiment of the present invention includes a bus bar termination for a laminated electrically heatable window in which the window includes an electric resistive element embedded in the window, and an electrically conductive bus bar lead extending from an edge of the window. The bus bar lead is electrically connected to a cable for conducting electrical current to the resistive element of the window. When using the window in automobiles, the cable can be the harness cable leading from the alternator or generator. Each bus bar termination includes separate electrical contacts on the ends of the bus bar lead and the harness cable for forming a cooperating pin and socket connection. An electrically insulating protective sleeve is sealed around the cooperating pin and socket connection to make a hermetically sealed, completely water-proof enclosure for the electrical contact.

The bus bar termination of this invention permits quick, low labor content assembly of the cable and bus bar contacts. The cooperating pin and socket can be easily fitted together in a pressure fit which makes a reliable connection. In a preferred form of the invention, the protective sleeve is an initially loose-fitting section of a heat shrinkable tubing. After the pin and socket are connected, the heat shirnkable tubing is slipped over the connection and heat treated so it shrinks to a tight hermetic seal around the connection. When using the window in automobiles, the steps of connecting the contacts and heat-shrinking the protective sleeve can be performed after final lamination by the glass laminator, so that finished windows can be stored and then shipped to the automobile assembly plants with the harness cables attached. Windows using this bus bar termination can be completely inspected for electrical integrity before sealing the contact, so that rejects from the glass laminating processing do not include the cost of electrical terminal parts and the labor for connecting them. Pre-laminates are also similarly readily inspected.

DRAWINGS

These and other aspects of the invention will be more fully understood by referring to the following detailed description and the accompanying drawings in which:

FIG. 1 is a schematic view showing a typical laminated electrically heatable windshield constructed in accordance with principles of this invention;

FIG. 2 is a fragmentary schematic cross-section elevation view taken on line 2—2 of FIG. 1 and showing a detail of the bus bar termination of this invention, this view being greatly exaggerated and having some elements proportionately different in size from their actual size for the purpose of clarity;

FIG. 3 is a fragmentary, partly exploded, plan view enlarged to show the portion of the bus bar termination within the circle 3 of FIG. 1;

FIG. 4 is a fragmentary, partly exploded plan view, partly broken away, illustrating an alternate embodiment of electrical termination;

FIG. 5 is a fragmentary plan view illustrating the completed bus bar termination after the components of FIG. 3 are assembled and sealed; and FIG. 6 is a fragmentary, partly exploded plan view, illustrating a further alternate embodiment of the electrical termination.

DETAILED DESCRIPTION

FIG. 1 illustrates a typical electrically heatable automobile windshield 10 constructed according to the priniciples of this invention. The windshield is transparent throughout most of its area and includes an electrically conductive or resistive layer of vacuum-deposited metal embedded in it for electrically heating the window to remove ice or frost, for example. The conductive layer of metal is sufficiently thin to be transparent. The invention also is useful with other types of conductive layers in the windshield, such as metal oxide, fine conductive wire, or frit type resistive elements.

A thin generally planar and relatively flexible elongated copper foil bus bar 12, such as one made according to the disclosure in U.S. Pat. No. 3,612,745, extends along the upper edge of the windshield. The bus bar 12 is embedded in the window at a location just slightly inboard the top edge of the window, and the bus bar extends substantially the entire width of the window. A lead portion 14 of the bus bar 12 extends down along one edge of the window. The lead portion 14 of the bus bar 12 includes a terminal portion 16 which extends beyond the bottom edge of the window and is shown in greater detail in FIGS. 2 and 3. The extension beyond the glass edge is exaggerated for clarity in these figures. In practice the bus bar termination is almost adjacent the glass edge. The bus bar and its exterior terminal portion can be a continuous conductive strip, or the terminal portion of the bus bar can be a separate conductive tab, such as that described in greater detail below.

A second bus bar 18 extends along the bottom edge of the window and terminates in an electrical terminal identical in construction to terminal 16, which also extends beyond the bottom edge of the window. The bus bar 18 makes a slight downward jog at the mid-line of the window to form a lower extension 19 extending half-way across the window. A third bus bar 20 extending approximately half-way across the window is embedded along the lower edge of the window immediately above the lower extension 19 of the bus bar 18. The third bus bar 20 also has an electrical terminal lead extending beyond the bottom edge of the window which is identical in construction to the terminal leads for the other two bus bars. The bus bars make electrical contact to the conductive layer. There is no electrical continuity between the parallel sections of bus bars 19 and 20.

An electrical isolation line 22 extends vertically across the window and divides the embedded conductive film into two conductive areas 24 and 26. The electrical isolation line is an extremely fine scribe line which interrupts the electrically conductive film in the window, and typically this line is almost invisible. Additional isolation lines (not shown) may be provided between adjacent bus bars and along the leads to the bus bars for limiting current flow between the bus bars.

During operation of the electrically heatable window, current is passed between the first bus bar 12 and the lower bus bar 20 for heating the resistive area 24. Current is separately passed between the top bus bar 12 and the portion of the second lower bus bar 18 beyond the end of the shorter lower bus bar 20 for electrically heating the second resistive area 26 of the windshield. Typically, the current through the two conductive areas 24 and 26 is applied in two phases from a three phase alternator 28 which distributes electric current in a circuit which includes a power supply 30, such as the automobile storage battery. The third phase is typically applied to the back window of the automobile. Other power sources may be D.C. or single phase A.C. and require corresponding changes in the bus bar configuration, with the elimination of the isolation line 22. If a three phase power source is used for the windshield only, then two such isolation lines would be present and would divide the windshield into three approximately equal areas with appropriate reconfiguration of the bus bars.

FIG. 2 illustrates the detailed construction of the electrical termination 16 for transmitting electric current to the resistive areas of the windshield. The windshield 10 has two exterior face plies 32 of glass. A pair of transparent plastic interlayers 34 and 35, preferably made of polyvinyl butyral, are bonded to and between the sheets of glass. A carrier film 36 of transparent plastic such as polyethylene terephthalate is sandwiched between the interlayers 34 and 35 over most of the area of the window and is bonded to both interlayers. The carrier film 36 has an extremely thin layer 38 of a conductive metal on at least one of its surfaces (shown greatly exaggerated in thickness in FIG. 2). The conductive metal layer 38 is applied to the carrier film 36 preferably by vacuum deposition techniques. The interlayers 34 and 35 typically are bonded to the metal conated surface of the carrier film, or to the carrier film itself, by conventional heat and pressure lamination in a manner well known in the art and referred to in U.S. Pat. No. 3,718,535.

Typically, a prelaminate comprising the interlayers 34 and 35 and the sandwiched carrier film 36 and conductive layer 38 are made by subjecting the prelaminate to pressures of from 150 to 200 psi at elevated temperatures, say 200° F., for approximately 2 hours. The prelaminate also includes the bus bars 12, 14, 18, 19 and 20 sandwiched between the carrier film 36 and the prelaminate 34 overlying the carrier film so that one side of each bus bar is in direct electrical contact with the conductive metal layer 38, and the other side of each bus bar is bonded to the adjacent interlayer 34.

FIGS. 2 and 3 illustrate one embodiment of a bus bar termination according to this invention. The end portions of the bus bar extensions 14, 19 and 20 extend to a lower corner of the windshield 10, as shown in FIG. 1, and then extend beyond the bottom edge of the windshield to provide terminal connections for electrically connecting the bus bars to an electric harness cable 40 which conducts electric current to the resistive elements of the windshield. Typically, the harness cable 40 can be a conventional insulated conductor wire extending from the terminal connection of the bus bars to a junction box (not shown) in the automobile. Connections to the junction box then lead to the three-phase power source.

The terminal end of the harness cable 40 includes a tubular receptacle clip 44 or socket (preferably about 1/16 inch I.D. by ½ inch long) electrically connected to the end of the harness cable. As shown in FIG. 3, the longitudinal axis of the tubular receptacle 44 is collinear with the longitudinal axis of the cable 40. The terminal connection 16 also includes a male electrical contact which comprises an elongated cylindrical-shaped solid metal shank 46 having a male end pin 48 of smaller diameter which is sized for a snug reliable pressure fit into the receptacle tube 44. The solid cylindrical shank portion 46 of the male end pin has an outside diameter which matches the outside diameter of the receptacle 44.

Preferably, the shank 46 of the male end pin is attached to, or continuous with, a conductive metal tab 50 which is attached to the terminal portion of the bus bar 14 at its opposite end. As shown best in FIG. 2, a major portion of the conductive tab 50 is embedded in an edge portion of the window. The remaining portion of the conductive tab 50 extends outside the edge of the window for for connection to the male terminal contact pin. The embedded portion of the tab 50 includes a bare metal section 52 in electrical contact with the end of the bus bar 14, the two being attached by spot welding or soldering (not shown). The remaining embedded portion of the tab 50 and the portion of the tab which extends outside the edge of the window are coated with a layer 54 of suitable electrical insulator such as a baked-on ceramic or lacquer. The coated portion of the tab which is located immediately inboard the edge of the window is bonded to the top and bottom interlayers 34 and 35 to insure a waterproof vinyl seal against the tab 50. As shown best in FIG. 2, the area of the carrier film 36 coincident with the tab is precut away to form a void for receiving the tab to avoid a thickness build up between the sheets of glass. The outer surface of the cylindrical shank 46 also includes an outer coating of the electrically insulating material 54.

The conductive tab 50 is preferably a thin metal strip (the dimensions typically being 0.005 inch in thickness by ¼ inch in width by 1 inch in length). The axis of the male electrical contact is preferably perpendicular to the long dimension of the tab 50 to minimize the projected length beyond the glass edge in order to facilitate final lamination of the windshield. This also enables easy manufacture by wrapping the flat tab around the shank 46 and soldering if the pin, shank and flat strip are not formed integrally. Moreover, the connector on the end of the tab is located immediately adjacent the edge of the window, preferably being spaced from the window by a distance less that the diameter of the tab. This construction minimizes damage to the tab during the customary tacking by nip rollers prior to autoclave lamination. The male contact preferably is located so that a substantial portion of the length of the shank 46 extends beyond the edge of the tab 50 (typically the shank extends approximately ¼ inch away from the edge of the tab 50). The shank of the connector includes electrical insulation and the pin is bare.

The tab 50 is made from a material, such as phosphor bronze, or brass, having a greater strength and shear modulus than the bus bar. This construction provides good resistance to shear of the tab at the edge of the window when the terminal connection is subjected to pull in a direction which would tend to tear the exterior portion of the tab adjacent the edge of the window or prelaminate.

FIG. 4 shows an alternate form of the invention in which the male and female parts of the terminal connection shown in FIG. 3 are interchanged to form a connection in which a tubular electrical receptacle 144 is integral with the projecting end portion for the tab 50, and a male end pin 148 extends outwardly from the end of a harness cable 140 for supplying electric current to the resistive element of the window. In this form of the invention, the tubular socket 144 projects away from the edge of the tab 50 in a manner similar to the male connector shown in FIG. 3, and the male end pin 148 makes the same snug, reliable pressure fit in the socket 144.

The terminal contacts for the bus bar 20 and the bus bar extension 19 are constructed in a manner identical to that shown in FIGS. 3 and 4.

The prelaminate which includes the embedded bus bars also includes the projecting portions of the tabs 50 and the electrical contacts attached to the ends of the tabs, whether they be the male contact shown in FIG. 3, or the female contact shown in FIG. 4. As described above, these prelaminates are typically laminated with the face plies 32 of glass in a process which includes applying heat by an oil medium in an autoclave to bond the glass face plies to the plastic interlayers. After the laminated window is completed, the laminator then can assemble the bus bar terminal connections in the manner shown in FIGS. 3 or 4. The present invention allows these terminal connections to be assembled by inserting the male electrical pin into the female electrical socket to form a sung pressure fit. The contacts can be soldered after insertion if desired. The bus bar terminal connection shown in FIG. 3 also includes a loose-fitting protective sleeve 56 comprising a section of conventional heat shrinkable tubing which is slipped over the mating electric joint so that both the end of the electrical harness cable 40 and the projecting portion of the insulated shank 46 are covered by the tubing. The tubing is then heat treated so it shrinks to a tight hermetic seal around the opposite ends of the electrical connection. Since the diameters of the shank 46 and socket 44 are the same, a smooth connection is present on the inside of the heat shrink tubing. This assures secure electric insulation and a seal against weather. Further, the heat shrink tubing grips the connection to help prevent accidental dislodging making the harness cable essentially a permanent part of the window. The completed sealed connection is illustrated in FIG. 5.

Similarly, the terminal connection shown in FIG. 4 includes a loose-fitting, heat-shrinkable protective sleeve 156 which is slipped over the mating electrical joint so the projecting portion of the receptacle 144 and the end of the cable 140 are covered. The sleeve is then heat treated so it forms a tight hermetic seal around the electrical connection.

FIG. 6 shows a further alternate form of the invention in which a terminal connection 246 extends collinear with the elongate extent of the tab 250 and the bus bar 214. In this form of the invention, as in the others described above for FIGS. 3 and 4, the bus bar 214 and tab 250 are in electrical contact with one another and embedded in the laminated electrically heatable window 224. The terminal connection 216 includes a male contact having a metal shank 246 and projecting male end pin 248. The shank 246 is connected to the end of the tab 250 so the male end pin 248 extends generally perpendicular to the edge of the window 224. In the form illustrated in FIG. 6, the longitudinal axis of the pin 248 in collinear with the longitudinal axes of the tab 250 and bus bar 214. The shank 246 is either soldered to the end of the tab 250 to form an electrical connection between the two, or the tab and shank can be formed integrally. The exterior portion of the tab 250 and the outer surface of the shank 246 are coated with an electrically insulative layer. A portion of the tab located inboard of the edge of the window also is coated with an electrically insulative material and is bonded to the top and bottom interlayers of the window 224 to provide a waterproof vinyl seal against the tab. The projecting male end pin 248 is bare and makes a pressure fit in the electrical receptacle 244 which is electrically connected to the end of the cable 240. The heat shrinkable sleeve 256 is then slipped over the terminal pin-and-socket connection and heat shrunk to hermetically seal the connection.

As in FIGS. 3 and 4 above, the male and female contacts of the terminal connection shown in FIG. 6 can be interchanged to form a connection in which the tubular electrical receptacle 244 is integral with the projecting end portion of the tab 250, and the male end pin 248 and shank 246 are connected to the end of the cable 240.

Thus, the invention allows the glass laminator to make up the electrical connections and hermetically seal them after final lamination, so that windshields which are shipped to the automobile assembly plants for further assembly can have the electrical harness cable attached to them. Windshields make with the electrical terminal contacts of this invention can be completely inspected before inserting and sealing the harness cable so that rejects from the laminating process do not include the cost and labor content of these items.

One important advantage of the emboiment shown in FIG. 3 is that the use of a solid metal male electrical contact at the end of the bus bar avoids the risk of damage from mechanical crushing during pre-autoclave tacking, or the receptacle filling with autoclave oil during lamination which would then require careful degreasing before a reliable electrical joint can be established.

The terminal connection of this invention is only a fraction of an inch from the edge of the window as compared with the prior tab that was six inches or more in length. It is lightweight and gives reliable connections without springs or pressure contacts. The cost of components is greatly lower than the prior flat tab or other termination means involving soldering and caulking, and installation costs are also reduced. The connector becomes integral with the window and the lead wires can be taken a considerable distance to a convenient terminal point for connection into the automobile's electrical system. In the prior tab the electrical system was essentially brought to the tab and the terminal point was near the window.

What is claimed is:

1. A prelaminate for a laminated electrically heatable window comprising:
    a transparent sheet-like carrier film having a cut-out section adjacent an edge of the prelaminate,
    an electrically resistive heating layer on a surface of the carrier film,
    transparent, flexible, electrically insulated layers bonded to opposite surfaces of the carrier film, one of said insulated layers overlaying the electrically resistive heating layer,
    a pair of conductive bus bars embedded between the electrically resistive heating layer and the insulated layer overlaying the electrically resistive heating layer,
    a separate electrically conductive tab in electrical contact with each bus bar, each tab being disposed in a corresponding cut-out portion of the embedded carrier film, each tab also projecting outside the prelaminate away from an edge of the prelaminate, the electrically insulated layers overlaying and being bonded to the portions of the bus bars disposed in the cut-out sections of the carrier film,
    separate electrical connectors on the remote ends of each tab outside the edge of the prelaminate, each electrical connector having an electrical contact for forming a cooperating electrically conductive pin-and-socket connection with a complementary electrical contact, and
    means electrically insulating the portion of each tab extending outside the edge of the prelaminate and at least a portion of each tab bonded to the insulated layers.

2. The combination according to claim 2 in which the electrical connector on each tab projects away from the tab and extends generally parallel to the edge of the prelaminate.

3. The combination according to claim 1 in which the electrical connector on each tab comprises an elongated, generally cylindrical portion of a relatively large diameter having an electrically insulated outer surface and an electrically conductive portion of a smaller diameter for engagement with a complementary-sized cooperating contact.

4. The combination according to claim 3 in which the electrical connector comprises a generally cylindrical shank having an electrically insulated exterior projecting away from the tab, and an electrically conductive pin on the remote end of the projecting shank for being engaged with a cooperating socket of said complementary electrical contact.

5. The combination according to claim 1 in which the electrical connector is spaced from said edge of the prelaminate by a distance less than about the width of the tab.

6. The combination according to claim 1 in which each tab has a higher strength and shear modulus than the bus bars.

7. The combination according to claim 1 in which the electrical connectors are arranged on the electrical lead and the cable so the cooperating pin-and-socket connection extends in a direction generally parallel to the elongate entent of the electrical lead.

8. A prelaminate for a laminated electrically heatable window comprising:
a transparent sheet-like carrier film,
an electrically conductive element on the carrier film, the conductive element having a generally flat face,
a transparent electrically insulated layer bonded to the carrier to embed the conductive element between the carrier and the insulated layer,
a generally flat, electrically conductive strip in electrical contact with said electrically conductive element and embedded between the conductive element of the carrier and the insulated layer, a portion of the conductive strip projecting outside an edge of the prelaminate;
a first electrical connector on the remote end of the conductive strip outside the edge of the prelaminate, the electrical connector having an electrical contact for forming a cooperating electrically conductive pin-and-socket connection with a complementary electrical contact, the electrical connector extending away from the main body of the strip in a direction generally parallel to said flat face of the conductive element, the electrical connector extending transverse to the length of the strip and being located closer to the edge of the prelaminate than the width of the strip, and
a second electrical connector means for making electrical contact with said electrically conductive element.

9. The combination according to claim 8 including a cut-out section of the embedded carrier film adjacent the edge of the prelaminate, the embedded portion of the conductive strip being disposed in the cut-out portion of the carrier film, the insulated layer being bonded to the portion of the conductive strip in said cut-out section.

10. The combination according to claim 8 in which the conductive strip comprises an embedded flexible conductive bus bar having a terminal portion in the vicinity of the cut-out section, and an elongated conductive tab having a portion thereof disposed in the cut-out section of the carrier; a further portion of the tab overlying the terminal portion of the bus bar for providing electrical contact between the bus bar and the tab; a portion of the tab projecting outside the edge of the prelaminate, the electrical connector being on the remote end of the tab.

11. The combination according to claim 10 in which the tab has a higher strength and shear modulus than the bus bar.

12. The combination according to claim 8 including separate transparent electrically insulated layers bonded to opposite surfaces of the carrier film, a portion of the electrically conductive strip immediately inboard the edge of the prelaminate being embedded between the electrically insulated layers, and means electrically insulating said projecting portion of the strip and said inboard portion of said strip.

13. The combination according to claim 8 in which the electrical contact comprises a male contact.

14. The combination according to claim 13 in which the first electrical connector includes a generally cylindrical shank having an electrically insulated exterior projecting transversely away from the conductive strip, and the male contact projects in the same general direction from an end of the shank remote from the conductive strip.

15. The combination according to claim 8 wherein the second electrical connector means includes:
a second generally flat electrically conductive strip in electrical contact with said electrically conductive element and embedded between the conductive element of the carrier and the insulated layer, a portion of the conductive strip projecting outside an edge of the prelaminate, and
a second electrical connector on the remote end of the second conductive strip outside the edge of the prelaminate, the second electrical connector having an electrical contact for forming a cooperative electrically conductive pin-and-socket connection with a complementary electrical contact, the second electrical connector extending away from the main body of the second strip in a direction generally parallel to said flat face of the conductive element, the second electrical connector extending transverse to the length of the strip and being located closer to the edge of the prelaminate than the width of the strip.

* * * * *

UNITED STATES PATENT AND TRADEMARK OFFICE
CERTIFICATE OF CORRECTION

PATENT NO. : 4,029,942

DATED : June 14, 1977

INVENTOR(S) : Berton P. Levin

It is certified that error appears in the above-identified patent and that said Letters Patent are hereby corrected as shown below:

Column 1, line 29, "electriclly" should be--electrically--; line 33, "electricl" should be--electrical--; line 46, "laminate" should be--laminated--. Column 3, line 45, "priniciples" should be--principles--. Column 4, line 68, "conated" should be--coated--. Column 7, line 30, "in" should be--is--; line 59, "make" should be--made--; line 65, "emboiment" should be --embodiment--. Column 8, line 53, "claim 2" should be--claim 1--.

Signed and Sealed this

Twentieth Day of September 1977

[SEAL]

Attest:

RUTH C. MASON
Attesting Officer

LUTRELLE F. PARKER
Acting Commissioner of Patents and Trademarks